(12) United States Patent
Bukkems et al.

(10) Patent No.: US 10,768,482 B2
(45) Date of Patent: Sep. 8, 2020

(54) FLEXIBLE HOLDING DEVICE FOR A LIGHT SOURCE

(71) Applicant: SIGNIFY HOLDING B.V., Eindhoven (NL)

(72) Inventors: Peter Johannes Martinus Bukkems, Eindhoven (NL); Christoph Gerard August Hoelen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/099,563

(22) PCT Filed: May 9, 2017

(86) PCT No.: PCT/EP2017/061031
§ 371 (c)(1),
(2) Date: Nov. 7, 2018

(87) PCT Pub. No.: WO2017/194526
PCT Pub. Date: Nov. 16, 2017

(65) Prior Publication Data
US 2019/0155101 A1 May 23, 2019

(30) Foreign Application Priority Data
May 13, 2016 (EP) .................................... 16169481

(51) Int. Cl.
*G02F 1/13357* (2006.01)
*F21V 19/00* (2006.01)
(Continued)

(52) U.S. Cl.
CPC .... *G02F 1/133608* (2013.01); *F21V 19/0075* (2013.01); *F21V 23/06* (2013.01); *G02F 1/133604* (2013.01); *F21Y 2115/10* (2016.08)

(58) Field of Classification Search
CPC ......... G02F 1/133608; G02F 1/133604; F21V 19/0075; F21V 23/06; F21Y 2115/10
See application file for complete search history.

(56) References Cited

U.S. PATENT DOCUMENTS

| 7,834,434 B2 | 11/2010 | Shimada et al. | |
|---|---|---|---|
| 2002/0105255 A1* | 8/2002 | Bankuti | F21V 19/0075 313/318.02 |

(Continued)

FOREIGN PATENT DOCUMENTS

| EP | 2208925 B1 | 3/2013 |
|---|---|---|
| WO | WO200913453 A1 | 11/2009 |

*Primary Examiner* — Mary Ellen Bowman
(74) *Attorney, Agent, or Firm* — Daniel J. Piotrowski (57) ABSTRACT

The present invention relates to a holding device (100) for a light source (200), comprising a first portion (110) and a second portion (120). The first portion and the second portion extend at least partly in a common plane. The second portion is movable relative to the first portion from a first position, before insertion of the light source, in which the first portion and the second portion form a slit (130) for receiving the light source, and to a least a second position, after insertion of the light source, in which the second portion clamps the light source in the slit. Further, a lighting assembly and a display unit comprising such a holding device and a light source is disclosed. The holding device comprises fewer parts and is easier to manufacture as compared to prior art devices.

17 Claims, 3 Drawing Sheets

(51) Int. Cl.
*F21V 23/06* (2006.01)
*F21Y 115/10* (2016.01)

(56) References Cited

U.S. PATENT DOCUMENTS

2009/0279282 A1* 11/2009 Iwamoto ............... F21V 19/009
                                              362/97.1
2010/0097784 A1   4/2010 Chen

* cited by examiner

Fig. 5

FLEXIBLE HOLDING DEVICE FOR A LIGHT SOURCE

CROSS-REFERENCE TO PRIOR APPLICATIONS

This application is the U.S. National Phase application under 35 U.S.C. § 371 of International Application No. PCT/EP2017/06131, filed on May 9, 2017, which claims the benefit of European Patent Application No. 16169481.5, filed on May 13, 2016. These applications are hereby incorporated by reference herein.

FIELD OF THE INVENTION

The present invention generally relates to the field of holding devices for light sources, and in particular to a holding device comprising a first portion that is movable relative to a second portion so as to clamp the light source therebetween.

BACKGROUND OF THE INVENTION

The growing interest in high definition display devices, such as e.g. high definition display television (HDTV) devices, has resulted in an increased demand for high lumen light sources and improved thermal management of heat generated by such light sources.

Examples of existing systems for generating light and dissipating generated heat include a rod-shaped light source and a holder for mechanically supporting and cooling the light source. The holder comprises a base part for receiving the light source, a thermally conducting bar for allowing heat to be transferred from the light source, and a flat spring for biasing the thermally conducting bar towards the light source. The holder parts are kept together by a respective side plate configured to direct the output light in a desired direction.

Although such systems may provide a desired light output and cooling, they are relatively complex to produce and require high mechanical component tolerances in order to function properly. Thus, there is still a need for relatively low-cost holding devices that are easy to manufacture and suitable for large-scale production.

SUMMARY OF THE INVENTION

It would be advantageous to achieve a holding device for a light source overcoming, or at least alleviating at least part of the above mentioned drawbacks. In particular, it would be advantageous to provide a holding device that is less complex and cheaper to produce.

To better address one or more of these concerns, a holding device, a lighting assembly and a display unit having the features defined in the independent claims are provided. Advantageous embodiments are defined in the dependent claims.

Hence, according to a first aspect, a holding device comprising a first portion and a second portion is provided. The first portion and the second portion extend at least partly in a common plane. Further, the second portion is arranged such that it is movable relative to the first portion from a first position, before insertion of the light source, in which the first portion and the second portion form a slit for receiving the light source, and to at least a second position, after insertion of the light source, in which the second portion clamps the light source in the slit against the first portion or vice versa.

According to a second aspect, a lighting assembly comprising a light source and a holding device according to the first aspect is provided.

According to a third aspect, a display unit comprising a light source and a holding device according to the first aspect is provided.

A poor thermal contact between the light source and the holding device may impair the heat transfer between the light source and the holding device and thereby result in a poor thermal performance. Thus, it is desirable to maintain a high accuracy of the positioning of the light source in the holding device during operation. The present aspects are based on the understanding that the accuracy of the positioning of the light source, and thus the thermal performance, may be improved by clamping the light source between at least two portions of the holding device, wherein at least one of the portions is movable relative to holding device. As a result, the clamping may be adjusted during operation and may compensate for e.g. heat induced deformations of the holding device and dimensional differences relating to mechanical component tolerances.

The holding device may be configured to receive or accommodate a light source between the first portion and the second portion. This may be achieved by arranging the second portion in the first position, which also may be referred to as a first state or idle state, in which the second portion and the first portion may be assembled or coupled to form or define e.g. a gap, channel, passage or slit between the first portion and the second portion. The slit may have an opening or entrance, through which the light source may be inserted in the holding device, and an end portion opposing the entrance. Further, the slit may have a bottom portion, which e.g. may be defined by the second portion, and a top portion that may be defined by the first portion. The clamping force may be obtained as the second portion in the second position is biased or forced towards the first portion, or vice versa. The surfaces of the slit, i.e., the surfaces of the respective portions of the holding device that are in thermal contact with the light source, may be adapted, or fitted, to the corresponding surfaces of the light source so as to allow for an efficient heat transfer between the light source and the holding device. In other words, the shape or configuration of the slit may be form-fitted to the light source so as to improve the thermal contact therebetween.

In an embodiment, the first portion may form a frame portion and the second portion a clamping portion that is connected to the frame portion. The clamping portion, which also may be referred to as a biasing portion or coupling portion, may be resiliently or elastically connected to the frame portion so as to allow a relative motion therebetween and to provide a clamping force for holding the light source in its intended position. The connection between the clamping portion and the frame portion may be adjusted in terms of strength and elasticity depending on the size of the light source and the desired clamping characteristics so as to allow for a flexible holding device capable of providing a reliable positioning and cooling of the light source. The flexible connection of the clamping portion to the frame portion further allows for the clamping of the light source to be adjusted in response to dimensional changes induced by thermal expansion, thereby reducing the risk for the light source to break. The clamping force may be varied over the slit, e.g. such that the clamping force is higher close to an entrance of the slit as compared to the rest of the slit. Such a difference in clamping force may prevent the light source from creeping out of the slit due to thermal expansion.

In other words, at least one of the first portion and the second portion may be movable in the common plane of the first portion and the second portion, which plane may coincide with a main plane of extension of the holding device. At least one of the portions may thus be movable towards and/or away from the other such that the width or size of the slit for receiving the light source varies accordingly. The second portion may be arranged within the first portion, which thus forms a frame portion, such that an outer periphery of the holding device is not changed as the second portion moves. However, in some examples both the first portion and the second portion may be arranged within an additional frame or frame portion, such that an outer periphery of the holding device is not changed as the second portion and/or first portion moves.

According to an embodiment, the connection between the clamping portion and the frame portion may be a spring-coupling provided by e.g. a flexible bridge or neck extending between the frame portion and the clamping portion. The spring coupling may be adapted to counteract displacement of the clamping portion relative to the frame portion such that the clamping portion tends to recoil or spring back against the slit and the light source arranged therein. The clamping or biasing force acting on the light source may be provided by inserting the light source in a slit or gap that may be slightly smaller than the light source. Hence, the light source may be mounted in the holding device by slightly pressing or pushing the clamping portion such that the slit temporarily widened to receive the light source.

According to an embodiment, the second portion may comprise an upper portion defining the slit and a lower portion facing away from the slit. In this example, the second portion may be connected to a frame portion (or the first portion) at a respective side portion of the second portion, wherein the side portions separate the upper portion and the lower portion. As the second portion moves towards and away from the slit, the connection between the second portion and the frame portion (or first portion) may be subject to a bending force or torque forcing the second portion towards the slit.

According to an embodiment, the second portion may comprise an upper portion defining the slit and a lower portion facing away from the slit. According to this embodiment, the second portion may be connected to a frame portion (or first portion) at the lower portion of the second portion. As the second portion is moved towards and away from the slit, the connection between the second portion and the frame portion (or first portion) may be subject to a pulling force and a compressing force, respectively, causing the connection between the second portion and the frame portion to expand and compress in the common plane of the second portion and the frame portion (or first portion).

According to an embodiment, the holding device may comprise an adjustable force inducing member arranged between the frame portion and the lower portion of the second device. The force inducing member, which e.g. may comprise an adjusting screw, may be provided for adjusting the clamping force or the bias of the second portion towards the light source, and may be used for compensating differences in mechanical dimensions of individual holding devices and/or fine-tuning the clamping of the light source. The clamping may be varied over the slit, such that the clamping force e.g. may be highest close to the entrance of the slit.

According to an embodiment, the first portion and the second portion may form a respective clamping portion. The clamping portions may be arranged opposite to each other and may define the slit for receiving the light source. The first portion and the second portion may be movably connected to an additional frame or frame portion, which may be arranged to support and at least partly surround the first portion and the second portion. According to the present embodiment, the light source may be clamped between both clamping portions.

According to an embodiment, the light source may be pushed or slid into the slit defined by the first portion and the second portion. During insertion, the second portion may be pushed downwards (or vertically) from the first position to widen the slit, whereas the light source may be pushed into the slit. Alternatively, or additionally, the first portion may be pushed vertically away from the second portion so as to widen the slit. In one embodiment, the slit is shaped to allow the light source to be inserted in the slit from a direction intersecting the common plane of the first portion and the second portion. In another embodiment, the slit may be shaped to allow the light source to be inserted laterally in the slit through the entrance of the slit, in the common plane of the first portion and the second portion. The entrance may be formed as a hole shaped to receive the light source.

According to an embodiment, at least one of the first portion and the second portion may be tiltable out of the common plane of the first portion and the second portion. The tilting motion, or deflection, may e.g. be achieved by a flexible connection that may be configured to allow motion in several dimensions. Additionally, or alternatively, the first portion and/or second portion may be provided with e.g. a neck portion allowing at least a portion of the first portion and/or second portion to be moved or tilted. The possibility to tilt the first and/or second portion allows for the orientation of the first and/or second portion to be adjusted to the orientation or geometry of the light source. In case the contact surface of the light source is not entirely parallel to the contact surface of the first portion and/or second portion, the latter may be slightly tilted so as to at least partly compensate for this difference. Being able to compensate for dimensional or geometrical differences between the light source and the holding device may further improve the thermal contact between the components and hence the thermal performance of the holding device. Further, the requirements on mechanical component tolerances may be reduced since varying dimensions to at least some extent may be compensated by movement or displacement of the clamping portion.

The slit may be adapted to receive a rod-shaped light source. The rod-shaped light source may be capable of generating light along the entire, or at least a part of, the slit. The light source may e.g. be a rod for a beamer used in connection with e.g. backlighting of display units, such as e.g. HDTV devices. Further, the holding device may be adapted to receive a plurality of light sources, which may be configured for generating different colours of light. The light sources may e.g. be formed as rods arranged one after the other in the slit. The holding device may comprise a plurality of different clamping portions or segments, which may be movable independently of each other, or a clamping portion configured to apply a clamping force that varies along the slit, so as to allow for the clamping to be adjusted to each one of the plurality of light sources. This may e.g. allow for light sources of different width or thickness to be clamped in the same slit.

Alternatively, or additionally, the holding device may be adapted to receive a plurality of light sources, such as e.g. rods, that are arranged alongside or abreast of each other in the slit. The light sources may be adapted to generate different colours that may be combined into a common, multicoloured output.

The light may e.g. be generated by a light emitting diode (LED). However, it will be appreciated that the term "light source" may, in the context of the present application, refer to substantially any device or element that is capable of emitting radiation in any region or combination of regions of the electromagnetic spectrum, for example the visible region, the infrared region, and/or the ultraviolet region, when activated e.g. by applying a potential difference across it or passing a current through it. Therefore a light source can have monochromatic, quasi-monochromatic, polychromatic or broadband spectral emission characteristics. Examples of light sources include high intensity discharge (HID) lamps, semiconductor, organic, or polymer/polymeric light-emitting diodes (LEDs), blue LEDs, optically pumped phosphor coated LEDs, optically pumped nano-crystal LEDs or any other similar devices as known to a person skilled in the art.

According to an embodiment, the clamping portion may be connected to the frame portion so as to allow a higher clamping force at an entrance of the slit as compared to a clamping force at an end of the slit. Thus, the present embodiment allows for the light source, upon heating, to expand into the holding device rather than be pushed out from the slit. The external dimensions or periphery of a lighting assembly including such a holding device may thereby be less sensitive to heat induced deformation and hence allow for a more reliable and accurate positioning of the light source, relative to the holding device, during the life-time of the lighting assembly.

According to an embodiment, the holding device may further comprise a heat transferring member for transferring heat away from the first portion and/or the second portion.

According to an embodiment, the heat transferring member may be adapted to transfer heat between the clamping portion and the frame portion.

The heat transferring member, or heat pipe, according to the above embodiments may be integrated in the holding device, e.g. by molding, be formed as a thermal insert, or be thermally connected to an exterior of the holding device. The heat transferring member may be formed of a material that is relatively thin and flexible as compared to the material of the first portion and the second portion, thereby allowing for a relative movement between the first portion and the second portion. The heat transferring member, or heat pipe, may e.g. be formed as a hollow tube having relatively thin walls allowing the heat pipe to flex. In some embodiments, the heat pipe may be formed of a thermally conductive material such as carbon fibres or a metal such as e.g. copper.

According to an embodiment, the clamping portion and the frame portion may be integrally formed with each other, i.e., formed of a single piece or plate. Alternatively, or additionally the entire holding device may be formed of a single piece. The single piece may e.g. be a metal or ceramic plate, and may e.g. be formed by molding or sintering, or by a material removal process such as e.g. cutting, drilling, wire-cut electrical discharge machining (EDM) or milling. By forming the frame portion and the clamping portion of a single piece, a less complex device may be provided that requires fewer components and that can be produced with larger mechanical component tolerances. Thus, the bill-of-material can be reduced and the manufacturing process simplified.

The holding device may, according to some embodiments, comprise a plurality of clamping portions, which may be movable independently from each other. The clamping portions may e.g. be arranged to clamp the light source at different positions in the slit. In some examples, a first clamping portion may be adapted to apply a clamping force that is different from the clamping force applied by a second clamping portion. Further, it will be appreciated that the clamping portions may be arranged to clamp the light source from different directions, such as e.g. from opposing sides of the light source.

Further objectives of, features of and advantages with the present invention will become apparent when studying the following detailed disclosure, the drawings and the appended claims. For example, the present embodiments are not limited to holding devices adapted to receive only one light source. On the contrary, a plurality of identical or different light sources may be used. The light sources may e.g. be arranged alongside, or abreast of each other, and/or be arranged consecutively in e.g. a row.

Those skilled in the art realise that different features of the present invention, even if recited in different claims, can be combined in embodiments other than those described in the following.

BRIEF DESCRIPTION OF THE DRAWINGS

These and other aspects will now be described in more detail with reference to the appended drawings showing embodiments of the present invention.

All the figures are schematic, not necessarily to scale, and generally only show parts which are necessary in order to elucidate the embodiments, wherein other parts may be omitted or merely suggested. Like reference numerals refer to like elements throughout the description.

DETAILED DESCRIPTION

The present aspects will now be described more fully hereinafter with reference to the accompanying drawings, in which currently preferred embodiments are shown. This invention may, however, be embodied in many different forms and should not be construed as limited to the embodiments set forth herein; rather, these embodiments are provided for thoroughness and completeness, and fully convey the scope of the present aspects to the skilled person.

Figure 1:
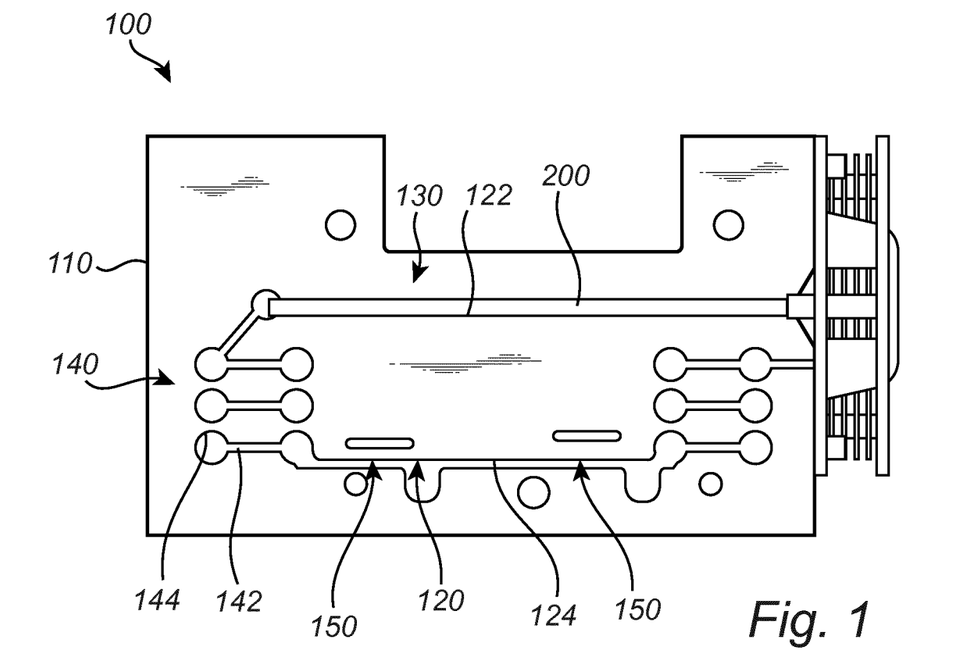
FIG. 1 is a side view of a holding device according to an embodiment.

A holding device according to an embodiment will be described with reference to FIG. 1. The holding device 100 may be formed of a plate-shaped body, made for example of a metal such as e.g. copper. The holding device 100 comprises a first portion, such as a frame portion 110 and a second portion, such as a clamping portion 120, wherein the frame portion 110 may be arranged to at least partly enclose or surround the clamping portion 120 that may be movable, in the plane of the plate-shaped body, relative to the frame portion 110. According to the present embodiment, the movable clamping portion 120 may be formed in a material removal process, such as e.g. cutting, drilling or milling, wherein material may be removed from the plate-shaped body so as to allow the clamping portion 120 to be movable relative to the frame portion 110. The clamping portion 120 and the frame portion 110 may define a gap, or slit 130, that extends between the clamping portion 120 and the frame portion 110 and is configured to receive a light source 200. Thus, the clamping portion may move towards the frame portion 110, thereby applying a force on the light source 200 arranged in the slit 130. As a result, the light source 200 is clamped between the frame portion 110 and the clamping portion 120. The clamping provides for a mechanical support and securing of the light source 200 and may enable heat transfer between the light source 200 and the holding device 100.

The clamping portion 120 may be resiliently or elastically connected to the frame portion 110 such that a spring action may be exerted on the clamping portion 120 as it is displaced relative to the frame portion 110. The spring action may e.g. be provided by a flexible bridge 142 and/or neck 144 arranged between the frame portion 110 and the clamping portion 120 and adapted to generate a counteracting spring force upon displacement of the clamping portion 120. The clamping force for holding the light source 200 may thus be determined, inter alia, by the effective spring constant or stiffness of the connection between the clamping portion 120 and the frame portion 110, and the displacement of the clamping portion 120 as compared to a the first position (which also may be referred to as idle state, or rest position) of the clamping portion 120. The width of the slit 130 may in the rest position be smaller than the corresponding thickness of the light source 200 such that the clamping portion 120 needs to be moved from the first position to widen the slit 130 to receive the light source 200 and thereby exert a clamping force on the light source 200. During assembling of the lighting assembly formed by the holding device 100 and the light source 200, the clamping portion 120 may be pushed downwards (or vertically) to widen the slit 130, whereas the light source 200 may be pushed laterally into the slit 130. After the light source 200 has been positioned in the slit 130, the clamping portion 120 may be released to spring back against the light source 200 into the second position and clamp the light source 200 in the slit 130.

As indicated in the present figure, the connection between the frame portion 110 and the clamping portion 120 may be provided at a respective side portion of the clamping portion 120, the side portions separating the upper portion 122 that faces the slit 130 from the lower portion 124 that faces away from the slit 124.

Additionally, the holding device 100 may comprise a force inducing member 150 for adjusting the clamping force. The force inducing member 150 may e.g. be arranged between the frame portion 110 and the lower portion 124 of the clamping portion 120, and may comprise e.g. an adjustable spring or an adjusting screw. The embodiment illustrated in FIG. 1 comprises two force inducing members 150 that are spaced apart from each other and arranged to adjust the clamping force, or spring force acting on the light source 200 in the slit 130. The first one of the force inducing members 150 may be arranged to increase the clamping force at an entrance of the slit 130, as seen from the inserting direction of the light source 200, whereas the second one of the force inducing members 150 may be arranged to increase the clamping force closer to the end of the slit 130, i.e., the portion of the slit 130 opposing the entrance of the slit 130. The clamping force may for example be highest close to the entrance of the slit 130 so as to prevent the light source 200 from being pushed out from the slit 130 as the light source 200 and/or the holding device 100 is subject to thermal expansion. The difference in clamping force may e.g. be achieved by letting the force inducing members 150 act on regions of the clamping portion 120 having different stiffness or effective spring constant. As indicated in the present figure, a different effective spring constant may be achieved by arranging a tensioning slit in the clamping portion 120, above the respective force inducing member 150, and vary the thickness of the material between the tensioning slit and the force inducing member 150. Increasing the thickness may increase the effective spring constant, and thus the applied clamping force, whereas reducing the thickness may lower the effective spring constant and thus the applied clamping force. In one example, the connection between the clamping portion 120 and the frame portion 110 may, when the light source 200 is mounted in the slit 130, generate a spring force of 1 N, whereas the force inducing members 150 may be tuned to generate a spring force of 35 N and 15 N, respectively.

Figure 2:
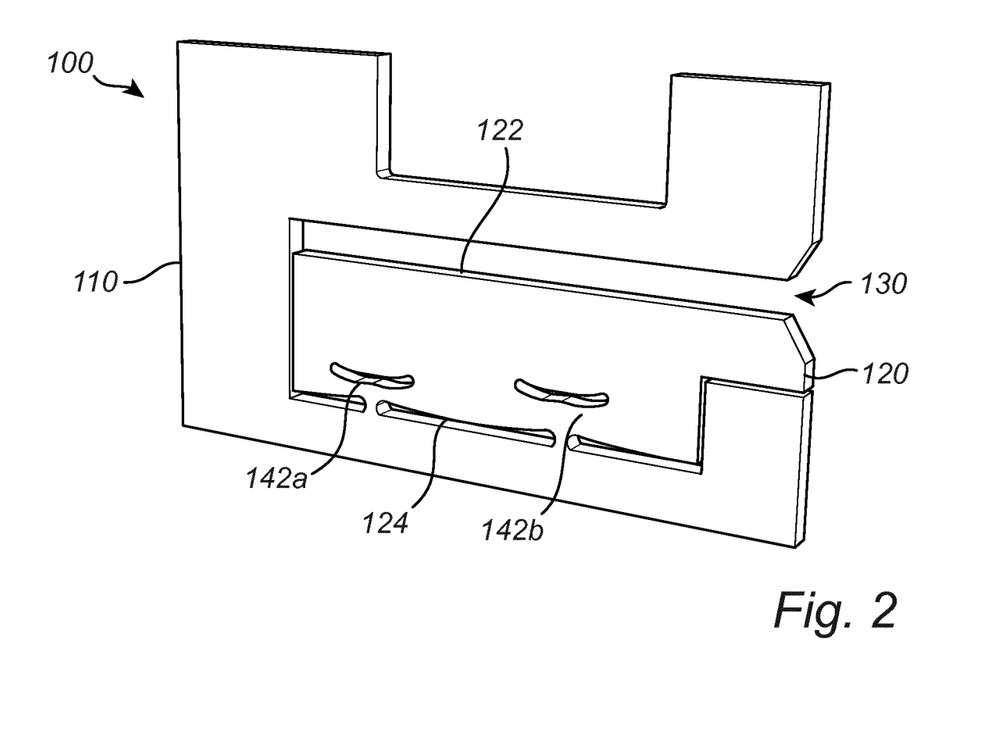
FIG. 2 is a perspective view of a holding device according to another embodiment.

FIG. 2 shows a perspective view of a holding device according to an embodiment that may be similarly configured as the holding device described with reference to FIG. 1. According to the present embodiment, the second portion or clamping portion 120 may be connected to the first portion or frame portion 110 at the lower portion 124 of the clamping portion 120. FIG. 2 illustrates the holding device 100 in a position wherein the clamping portion 120 has been displaced to widen the slit 130, e.g. for allowing the light source (not shown in FIG. 2) to be inserted in the slit 130. As the clamping portion 120 is pushed downwards, i.e., away from the slit 130, the lower portion 124 of the clamping portion 120 may be deformed and thereby generate a recoiling force that counteracts the force used for pushing the clamping portion 120 downwards. In the present figure, the clamping portion 120 is connected to the frame portion 110 via a first bridge 142a and a second bridge 142b that are adapted to flex or bend in response to the clamping portion 120 being moved. The bridges 142a, 142b may be defined by a slit in the clamping portion, and may be provided with different thicknesses so as to achieve different effective spring constants. In the present example, the bridge 142b may be thicker (as seen in the common plane of the clamping portion and the frame portion) than the bridge 142a, thereby allowing for a clamping force that is higher than the clamping force provided by bridge 142a. After the light source 200 has been positioned in the slit 130, the clamping portion 120 may spring back through the force or elasticity provided by the flexible bridges 142a, 142b and clamp the light source 200 in the slit 130.

Figure 3:
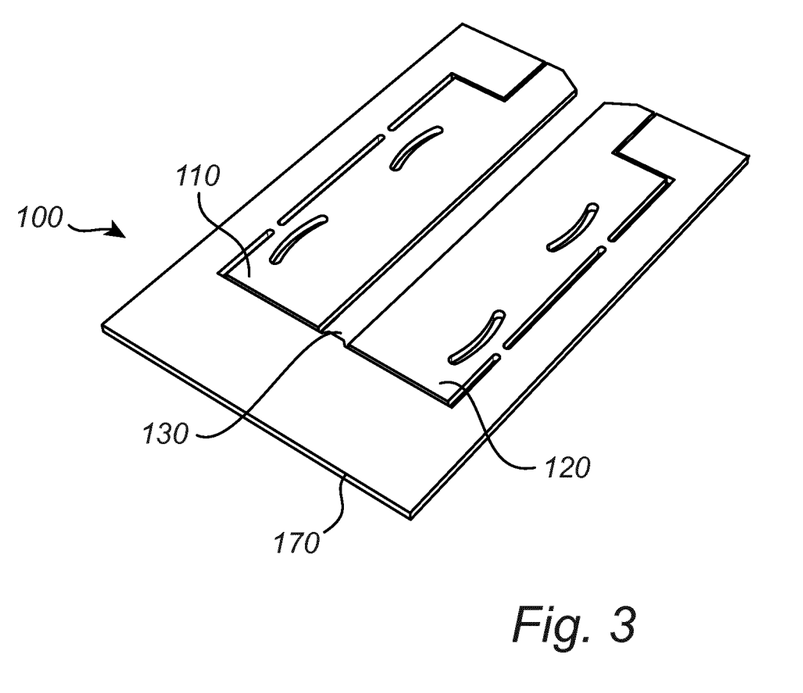
FIG. 3 is a perspective view of a holding device according to yet another embodiment.

FIG. 3 is a perspective view of a holding device according to a similar embodiment as discussed in connection with FIG. 2, wherein the second portion 120 is formed as a clamping portion similar to the clamping portions in FIGS. 1 and 2. In the present embodiment, the holding device 100 may comprise an additional frame 170 to which the first portion 110 and the second portion 120 are connected and movable relative to each other in the common plane of the frame 170, the first portion 110 and the second portion 120. The first portion 110 and the second portion 120 may thus be arranged to form a slit therebetween, in which the light source (not shown) may be clamped.

Figure 4:
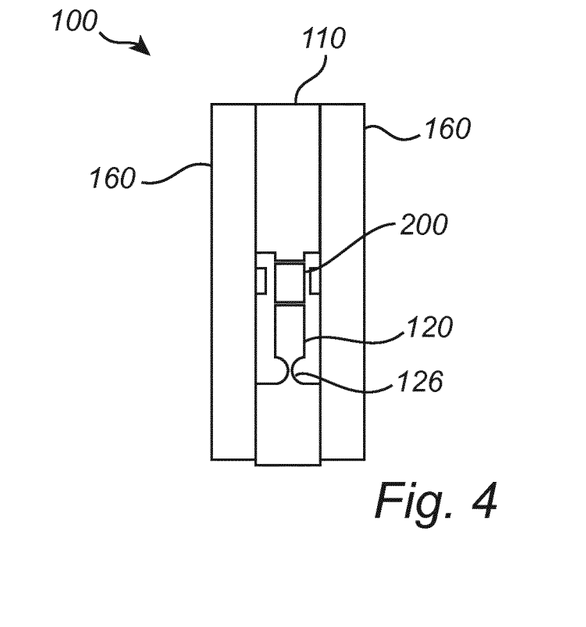
FIG. 4 is a cross sectional view of a holding device according to the embodiments illustrated in FIGS. 1 and 2. The cross section is taken orthogonal to the length extension of the slit.

FIG. 4 is a cross section of a portion of a holding device and a light source according to an embodiment that may be similarly configured as the embodiments discussed in connection with FIGS. 1 and 2. The cross section of the present figure is taken along a direction perpendicular to the length extension of the slit 130. As indicated in the figure, the clamping portion 120 may be formed to allow a tilting motion of at least a portion of the clamping portion 120 out of the main plane of extension of the holding device 100. The tilting may e.g. be achieved by means of a flexible neck 126. The tilting, or movement in a plane intersecting the main plane of extension, hence allows for the clamping portion 120 to be moved in two different planes so as to improve the adjusting of the clamping portion 120 to the clamped light source 200. This is particularly advantageous when the contact surface of the light source 200 and the corresponding contact surface of the clamping portion 120 are non-parallel or distorted relative to each other.

Figure 5:
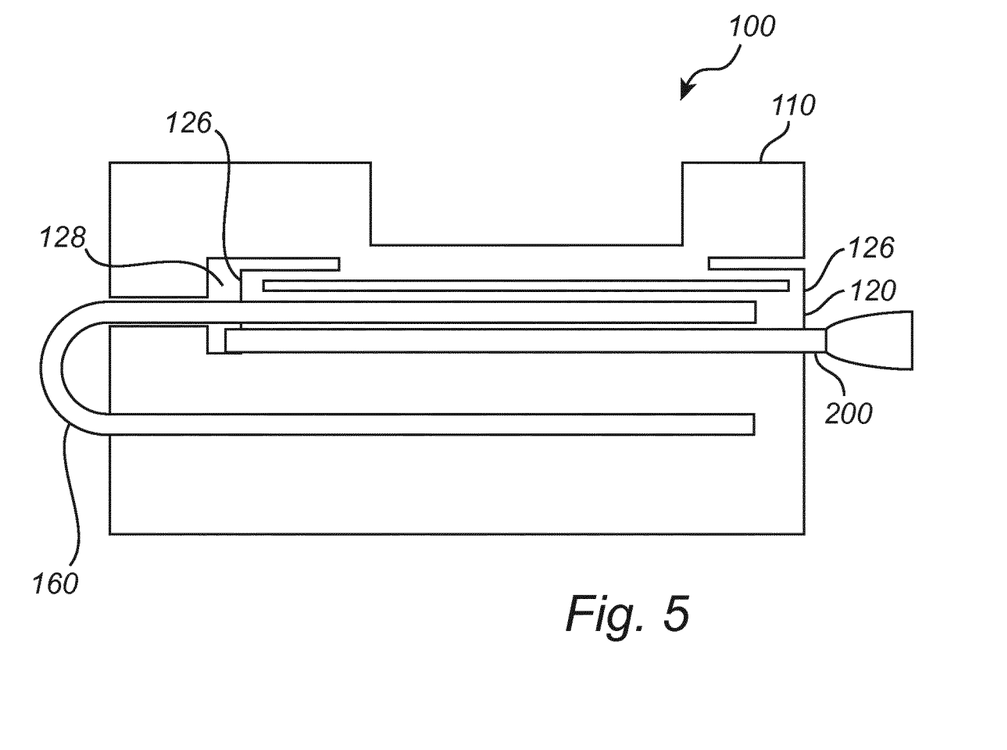
FIG. 5 is a cross sectional side view of a holding device and a light source, wherein the holding device comprises a heat transferring member according to an embodiment.

FIG. 5 is a cross sectional side view of a holding device according to an embodiment, which may be similarly configured as any one of the previously described embodiments. The figure illustrates a holding device 100 wherein a rod-shaped light source 200 is clamped in a slit between the frame portion 110 and a movable clamping portion 120. The clamping portion 120 may be elastically connected to the frame portion 110 such that the clamping portion 120 can be moved to adjust the width of the slit. Further, the clamping portion 120 may comprise a neck 126 that allows the clamping portion 120 to be tilted in a plane intersecting the plane of the plate-shaped holding device 100, or at least the common plane of the clamping portion 120 and the frame portion 110.

In addition to the above features, the holding device may comprise a heat transferring member or heat pipe 160, extending between the frame portion 110 and the clamping portion 120. The heat pipe 160 may be flexible so as not to interfere with the relative motion of the clamping portion 120 and the frame portion 110. As indicated in the present figure, there may be a vertical gap or space 128 between the clamping portion and the frame portion at the end of the slit 130 for allowing the relative motion. The distance between the frame portion 110 and the clamping portion 120, or, in other words, the width of the vertical gap 128, allows for the heat pipe 160 to flex and thus adjust to the movement between the frame portion 110 and the clamping portion 120.

The heat pipe 160 may be formed of a heat conducting material such as e.g. copper, and may be embedded in the material of the holding device by means of e.g. molding, arranged in a recess of the material and/or thermally connected to an exterior of the holding device.

The person skilled in the art realises that the present invention by no means is limited to the preferred embodiments described above. On the contrary, many modifications and variations are possible within the scope of the appended claims. Additionally, variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention claimed is:

1. A holding device formed of a plate-shaped body and for holding a rod-shaped light source in parallel to a main plane of extension of the plate-shaped body, comprising:
   a first portion being a frame portion; and
   a second portion being a clamping portion; wherein:
   the first portion and the second portion extend at least partly in said main plane of extension and define a slit that extends in said main plane of extension between the first portion and the second portion; and
   the second portion is movable relative to the first portion from a first position, before insertion of the rod-shaped light source, in which the first portion and the second portion form a slit for receiving the rod-shaped light source, and to at least a second position, after insertion of the rod-shaped light source, in which the second portion clamps the rod-shaped light source in the slit against the first portion, therewith providing a mechanical support and securing of the rod-shaped light source and enabling heat transfer between the rod-shaped light source and the holding device.

2. The holding device according to claim 1, wherein the clamping portion is connected to the frame portion by a spring coupling.

3. The holding device according to claim 1, wherein:
   the clamping portion comprises an upper portion defining the slit and a lower portion facing away from the slit; and
   the clamping portion is connected to the frame portion at the lower portion of the clamping portion and/or at a side portion of the clamping portion, said side portion separating the upper portion and the lower portion.

4. The holding device according to claim 3, further comprising an adjustable force inducing member arranged between the lower portion and the frame portion.

5. The holding device according to claim 1, wherein the first portion and the second portion are connected to a frame extending at least partly in said main plane of extension, and wherein the first portion and the second portion are movable relative to the frame.

6. The holding device according to claim 1, wherein the slit is shaped to allow the rod-shaped light source to be inserted in the slit from a direction intersecting said main plane of extension.

7. The holding device according to claim 1, wherein the slit comprises an entrance through which the rod-shaped light source is allowed to be inserted in the slit.

8. The holding device according to claim 1, wherein the slit is shaped to receive a rod-shaped light source.

9. The holding device according to claim 1, wherein the first portion and/or second portion is/are tiltable out of said main plane of extension.

10. The holding device according to claim 1, wherein at least one of the first portion and the second portion comprises at least two clamping segments adapted to clamp the rod-shaped light source independently from each other.

11. The holding device according to claim 1, further comprising a heat transferring member for transferring heat from the first portion and/or the second portion.

12. The holding device according to claim 1, wherein the first portion and the second portion are formed of a single piece.

13. A lighting assembly comprising:
   a holding device according to claim 1; and
   a rod-shaped light source.

14. A display unit comprising:
a holding device according to claim 1; and
a rod-shaped light source.

15. The holding device of claim 1 wherein the rod-shaped light source is clamped over its entire length in between the first portion and the second portion.

16. The holding device of claim 1 wherein the rod-shaped light source is clamped in between the first portion and the second portion substantially over its entire length, and thereby transfers heat over this clamped section to the holding device.

17. The holding device of claim 1 wherein the second portion is plate-shaped.

* * * * *